United States Patent [19]

Bradfield

[11] Patent Number: 5,268,605
[45] Date of Patent: Dec. 7, 1993

[54] ELECTRICAL FIELD CONNECTION

[75] Inventor: Michael D. Bradfield, Anderson, Ind.

[73] Assignee: General Motors Corporation, Detroit, Mich.

[21] Appl. No.: 37,850

[22] Filed: Mar. 29, 1993

[51] Int. Cl.$^5$ .................... H02K 11/00; H02K 5/14
[52] U.S. Cl. .................... 310/71; 310/68 R; 310/239
[58] Field of Search .................... 310/68 R, 68 D, 71, 310/220, 221, 239

[56] References Cited

U.S. PATENT DOCUMENTS

| | | | |
|---|---|---|---|
| 3,226,581 | 12/1965 | Brewster et al. | 310/59 |
| 3,299,303 | 1/1967 | Newill et al. | 310/66 |
| 3,329,840 | 7/1967 | Binder | 310/68 D |
| 3,361,915 | 1/1968 | Baker | 310/68 |
| 3,538,362 | 11/1970 | Cheetham et al. | 310/68 |
| 3,539,850 | 11/1970 | Sato | 310/71 |
| 3,586,892 | 6/1971 | Sato | 310/68 |
| 3,731,126 | 5/1973 | Hagenlocher et al. | 310/68 D |
| 4,161,775 | 7/1979 | Franz et al. | 310/68 D |
| 4,232,238 | 11/1980 | Saito et al. | 310/68 D |
| 4,284,915 | 8/1981 | Hagenlocher et al. | 310/68 D |
| 4,359,656 | 11/1982 | Fasterding et al. | 310/68 R |
| 4,449,090 | 5/1984 | Gotoh | 310/68 R |
| 4,604,538 | 8/1986 | Merrill et al. | 310/68 D |
| 4,606,000 | 8/1986 | Steele et al. | 310/68 D |
| 4,636,706 | 1/1987 | Bowman et al. | 322/28 |
| 4,859,894 | 8/1989 | Akutsu et al. | 310/68 R |
| 4,959,576 | 9/1990 | Horibe et al. | 310/239 |

Primary Examiner—R. Skudy
Assistant Examiner—C. LaBalle
Attorney, Agent, or Firm—Creighton R. Meland

[57] ABSTRACT

A brush holder and voltage regulator are secured to a metallic end frame of an alternating current generator by a metal screw that extends through aligned openings that extend respectively through the brush holder and voltage regulator. The brush holder has a pair of opposed metal terminals and the voltage regulator has a pair of opposed metal terminals. All of the terminals have openings that are aligned with the openings in the brush holder and voltage regulator. The screw extends through the openings in the terminals and has a threaded portion that is threaded into a threaded bore in the end frame. One of the terminals on the brush holder directly engages a surface on the end frame. The other terminal on the brush holder directly engages a terminal on the voltage regulator. The other terminal on the voltage regulator is electrically connected to the end frame by the screw.

5 Claims, 1 Drawing Sheet

U.S. Patent     Dec. 7, 1993     5,268,605

ELECTRICAL FIELD CONNECTION

This invention relates to an electrical field connection for electrically connecting the field coil of a rotor of an alternating current generator to a voltage regulator and to brushes supported by a brush holder that engage slip rings of the rotor of the generator.

In electrical systems of the type disclosed in the Bowman et al. U.S. Pat. No. 4,636,706, a voltage regulator is shown that is electrically connected to the field coil of an alternating current generator. In electrical systems of the type shown in the Bowman et al. patent, there are at least three electrical connections that must be made to electrically connect the voltage regulator to the field coil. One of these electrical connections is between a node or junction in the voltage regulator that is connected to one side of a semiconductor switch, such as a field effect transistor, and a brush that is carried by a brush holder. Another electrical connection that must be made is between a node or junction in the voltage regulator and motor vehicle ground. Finally, a connection must be made between another brush carried by the brush holder and motor vehicle electrical ground.

It is an object of this invention to provide the three electrical connections that have been described by means of a single metallic threaded fastener that passes through openings in the brush holder and voltage regulator and wherein the single fastener is threaded into a metallic generator end frame and further wherein the fastener secures the voltage regulator and brush holder to the end frame.

More specifically, the voltage regulator is provided with a pair of opposed terminals that have openings to receive the fastener. The brush holder has a pair of opposed terminals that are respectively connected to brushes and these terminals have openings for receiving the fastener. The voltage regulator and brush holder are secured to a metallic end frame of an alternating current generator by passing the fastener through an opening in the voltage regulator that is aligned with the openings in the voltage regulator terminals and through an opening in the brush holder that is aligned with the openings in the brush holder terminals. The threaded fastener is threaded into a threaded portion of the metallic generator end frame. When the generator is installed on a motor vehicle, the end frame is at ground electrical potential and in a negative ground system, the negative side of the motor vehicle battery is connected to ground. One of the brush holder terminals directly engages the generator end frame and accordingly, it is connected to ground. The metallic fastener has a head portion that is electrically connected to the ground terminal of the voltage regulator and when the fastener is threaded into the generator end frame, the voltage regulator ground terminal is connected to the generator end frame or to ground through the metallic fastener. One of the voltage regulator terminals and one of the brush holder terminals directly engage each other when the fastener is tightened to thereby electrically connect these two terminals.

Figure 1:
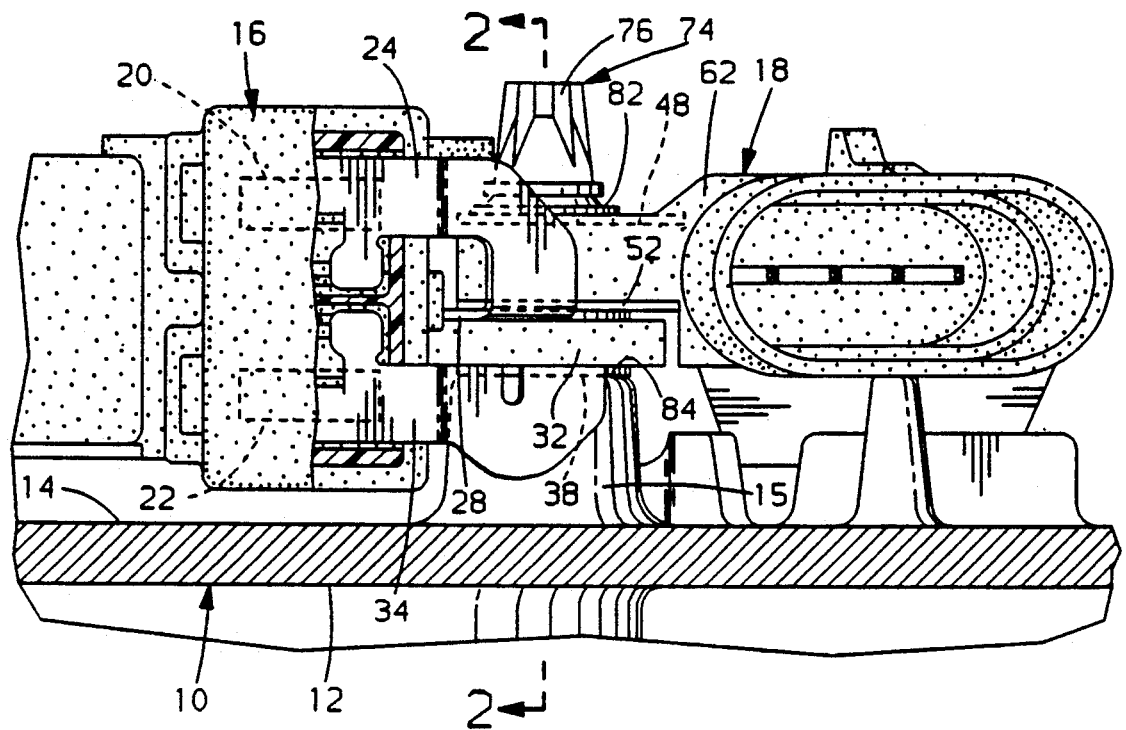
FIG. 1 is an end view of a voltage regulator and brush holder shown secured to an end frame of an alternating current generator.

Referring now to the drawings and more particularly to FIG. 1, the reference numeral 10 designates a metallic slip ring end frame of an alternating current generator for automotive use. The end frame 10 can be formed of aluminum and it has a surface 12 that faces the interior of the generator and a surface 14 that faces the exterior of the generator. The frame 10 has an axially extending boss portion 15. When the generator is installed on a motor vehicle, the frame 10 is connected to motor vehicle electrical ground and to the negative terminal of a storage battery that is connected to motor vehicle ground.

Figure 3:
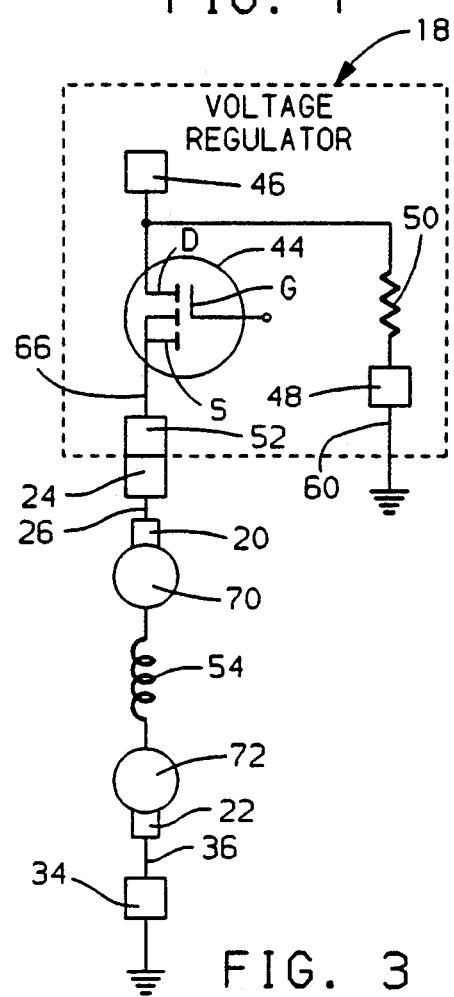
FIG. 3 is a schematic circuit diagram illustrating electrical connections between a voltage regulator and the field coil of an alternating current generator.

The end frame 10 supports a brush holder generally designated as 16 and a voltage regulator module generally designated as 18. The brush holder 16 is formed of a molded plastic electrical insulating material and it has cavities that respectively slidably support carbon brushes 20 and 22. Brush 20 is electrically connected to a metallic terminal or conductor 24 by a conductor 26. Terminal 24 is carried by the brush holder. Conductor 26 is not illustrated in FIG. 1, but it is schematically illustrated in FIG. 3. The terminal 24 has a terminal portion 28 that has a circular hole or opening 30. The terminal portion 28 is located on one side of a laterally extending flange or brush holder support portion 32 of brush holder 16.

The brush holder 16 carries another metallic conductor or terminal designated as 34. This terminal 34 is electrically connected to brush 22 by a conductor 36. Conductor 36 is not illustrated in FIG. 1, but is schematically illustrated in FIG. 3. Terminal 34 has a terminal portion 38 that has a circular hole or opening 40. The flange portion 32 of brush holder 16 has a circular hole or opening 42.

The voltage regulator 18 is an electronic semiconductor type of voltage regulator and can be of the type that is disclosed in the above-referenced Bowman et al. patent, U.S. Pat. No. 4,636,706. The disclosure of that patent is incorporated herein by reference.

A portion of the electronic circuitry of voltage regulator 18 is shown in the schematic circuit diagram of FIG. 3. As shown in FIG. 3, the voltage regulator 18 has a semiconductor switching device which is a field effect transistor 44 that has a drain D, a gate G and a source S. The drain D is connected to a terminal 46 that, in use, is connected to the positive output terminal of a bridge rectifier and to the positive terminal of a battery. Voltage regulator 18 has a ground terminal 48 that is electrically connected to motor vehicle ground. The ground terminal 48 is connected to various components of the voltage regulator including resistor 50.

The source S of voltage regulator 18 is connected to a terminal 50 which, as will be more fully described, is connected to one side of a field coil 54 of the rotor of the alternating current generator. The terminal 52 is a field coil voltage regulator output terminal. During operation of the voltage regulator, the field effect transistor 44 switches on and off to control field current. When transistor 44 switches to a conductive state, the voltage at terminal 52 goes positive since terminal 46 is connected to positive voltage.

Figure 2:
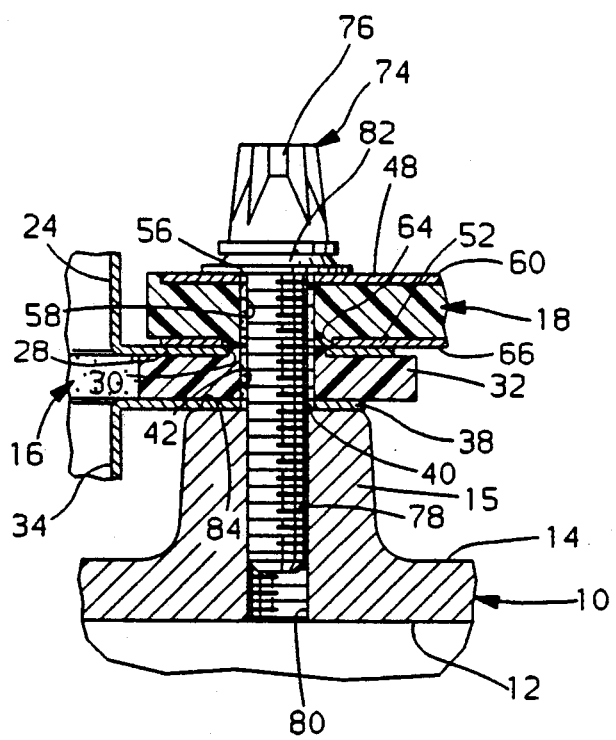
FIG. 2 is a sectional view taken along line 2-2 of FIG. 1.

The terminal 48 of voltage regulator 18, which is shown schematically in FIG. 1, takes the physical form of an annular metallic terminal 48 shown in FIGS. 1 and 2. The terminal 48 has a circular hole or opening 56 that is aligned with a circular hole or opening 58 that extends entirely through a portion of the voltage regulator 18. The apertured terminal 48 is connected to a terminal strip 60 that, in turn, is connected to a node or junction of the voltage regulator that is to be connected to motor vehicle ground. The integrated circuitry of the voltage regulator is enclosed by a plastic housing 62 for the voltage regulator 18. Terminal 48 and terminal strip 60 are supported by plastic material of the voltage regulator housing.

The terminal 52, which is shown schematically in FIG. 3, takes the physical form of a metallic annular terminal 52 shown in FIGS. 1 and 2. Terminal 52 has a circular hole or opening 64. Terminal 52 is connected to a terminal strip 66 which, in turn, is connected internally to the source S of the voltage regulator 18. Terminal 52 and terminal strip 66 are molded into the plastic housing material of the voltage regulator.

Referring now to FIG. 3, the field coil 54, which is carried by the rotor of the alternating current generator, has one end connected to a slip ring 70. The opposite end of field coil 54 is connected to slip ring 72. The slip rings are part of a slip ring assembly that is attached to a rotor shaft of the alternating current generator in a known manner so as to rotate with rotation of the rotor shaft. The brush 20 engages slip ring 70 and the brush 22 engages slip ring 72.

The voltage regulator 18 and the brush holder 16 are attached to end frame 10 by a metallic fastener screw 74 that has a head 76 for engaging a tightening tool and a threaded portion 78. The threaded portion 78 is threaded into a threaded bore 80 formed in frame boss 15. The screw passes through opening 56 in voltage regulator terminal 48, through opening 58 in voltage regulator 18, through opening 64 in voltage regulator terminal 66, through opening 30 in portion 28 of brush holder terminal 24 and through opening 40 in portion 38 of brush holder terminal 34. A metallic washer 82 is interposed between the head 76 of screw 74 and terminal 48 of the voltage regulator.

When screw 74 is fully tightened, the terminal portion 38 of the brush holder terminal 34 is forced into tight engagement with the upper surface 84 of boss 15 of frame 10. Therefore, the brush holder terminal 34 is electrically connected to frame 10. Since brush 22 is electrically connected to terminal 34, this brush is electrically connected to frame 10. As previously mentioned, the frame 10 is grounded to motor vehicle ground when the generator is installed on a motor vehicle and accordingly, one side of field coil 54 is grounded through the electrical connection that has been described.

Further, when the screw 74 is fully tightened, it causes terminal portion 28 of brush holder terminal 24 to tightly engage terminal 52 of voltage regulator 18 This electrically connects terminal 52 of the voltage regular 18 to the terminal 24 on the brush holder 16. This electrical connection therefore electrically connects the source S of field effect transistor 44 to brush 20 through conductor 26.

When the screw 74 is fully tightened, it provides an electrical connection between voltage regulator terminal 48 and frame 10. Thus, the metal washer 82 contacts voltage regulator terminal 48 and the head 76 of screw 74 is therefore electrically connected to terminal 48 through washer 82. The screw 74 is electrically connected to frame 10 by virtue of the threaded portion 78 being threaded into threaded bore 80.

The embodiments of the invention in which an exclusive property or privilege is claimed are defined as follows:

1. In combination, a metallic end frame for an alternating current generator, a brush holder formed of electrical insulating material having a brush holder support portion, said brush holder support portion having an opening extending therethrough, a voltage regulator having a portion that has an opening extending therethrough, means for securing said brush holder and said voltage regulator to said metallic end frame comprising a fastener formed of metallic electrically conductive material, said fastener extending through said opening in said brush holder support portion and through said opening in said voltage regulator, a first metallic electrical terminal disposed between and engaging respectively a surface on said end frame and a surface on said brush holder support portion, said first metallic electrical terminal electrically connected to a first brush that is supported by said brush holder, a second metallic electrical terminal carried by said brush holder that is electrically connected to a second brush that is carried by said brush holder, said voltage regulator having a third and fourth metallic terminal, said third terminal providing an output terminal for said voltage regulator and said fourth terminal providing a ground terminal for said voltage regulator, said third terminal directly engaging said second terminal to electrically connect said second and third terminals, said fastener electrically connecting said fourth terminal to said end frame.

2. The combination according to claim 1 where said fastener is a screw that has a threaded portion that is threaded into a threaded bore in said end frame.

3. The combination according to claim 1 where said voltage regulator has a semiconductor switching device that is electrically connected to said third terminal.

4. In combination, a metallic end frame for an alternating current generator, a brush holder formed of electrical insulating material having a brush holder support portion, said brush holder support portion having an opening extending therethrough, a first metallic electrical terminal disposed between and engaging respectively a surface on said end frame and a surface on said brush holder support portion, said first metallic electrical terminal electrically connected to a first brush that is supported by said brush holder, said first metallic electrical terminal having an opening extending therethrough that is aligned with said opening in said brush holder support portion, a second metallic electrical terminal carried by said brush holder support portion having an opening extending therethrough that is aligned with said opening in said brush holder support portion, said second metallic electrical terminal electrically connected to a second brush that is carried by said brush holder, a voltage regulator having a third metallic output terminal and a fourth metallic ground terminal, said third and fourth terminals having openings extending entirely therethrough that are aligned with an opening that extends through said voltage regulator, said third terminal directly engaging said second terminal to electrically connect said second and third terminals, and a screw formed of metallic electrically conductive material extending through said openings in said brush holder portion and in said voltage regulator and extending through said openings in said terminals, said screw having a threaded portion that is threaded into a threaded bore in said end frame, said screw having a head portion, said brush holder support portion and voltage regulator being tightly clamped between said head portion of said screw and said end frame, said screw electrically connecting said fourth terminal to said end frame.

5. The combination according to claim 4 where said voltage regulator has a semiconductor switching device that is electrically connected to said third terminal.

* * * * *